(12) United States Patent
Fukuda

(10) Patent No.: US 7,289,479 B2
(45) Date of Patent: Oct. 30, 2007

(54) COMMUNICATION DEVICE AND COMMUNICATION METHOD

(75) Inventor: Kunio Fukuda, Tokyo (JP)

(73) Assignee: Sony Corporation (JP)

( * ) Notice: Subject to any disclaimer, the term of this patent is extended or adjusted under 35 U.S.C. 154(b) by 965 days.

(21) Appl. No.: 09/980,867

(22) PCT Filed: Mar. 7, 2001

(86) PCT No.: PCT/JP01/01781

§ 371 (c)(1),
(2), (4) Date: Mar. 19, 2002

(87) PCT Pub. No.: WO01/67711

PCT Pub. Date: Sep. 13, 2001

(65) Prior Publication Data

US 2003/0012156 A1    Jan. 16, 2003

(30) Foreign Application Priority Data

Mar. 7, 2000    (JP)    ............................ P2000-067212

(51) Int. Cl.
*H04Q 7/24* (2006.01)
*H04Q 7/00* (2006.01)
*H04J 3/16* (2006.01)

(52) U.S. Cl. ...................... 370/338; 370/328; 370/466; 370/469; 370/401

(58) Field of Classification Search ............... None
See application file for complete search history.

(56) References Cited

U.S. PATENT DOCUMENTS

| | | | | |
|---|---|---|---|---|
| 5,675,628 A | * | 10/1997 | Hokkanen | 455/433 |
| 6,272,120 B1 | * | 8/2001 | Alexander | 370/338 |
| 6,701,361 B1 | * | 3/2004 | Meier | 709/224 |
| 6,721,805 B1 | * | 4/2004 | Bhagwat et al. | 709/250 |
| 6,914,897 B1 | * | 7/2005 | Schuster et al. | 370/352 |
| 6,930,987 B1 | * | 8/2005 | Fukuda et al. | 370/328 |
| 2001/0037397 A1 | * | 11/2001 | Boucher et al. | 709/230 |
| 2002/0034168 A1 | * | 3/2002 | Swartz et al. | 370/329 |
| 2004/0054799 A1 | * | 3/2004 | Meier et al. | 709/230 |

* cited by examiner

*Primary Examiner*—Chirag G. Shah
(74) *Attorney, Agent, or Firm*—Lerner, David, Littenberg, Krumholz & Mentlik, LLP

(57) ABSTRACT

For data transfer between a host device and a communication apparatus via a radiocommunication network and for data transfer between an external communication network outside the radiocommunication network and the communication apparatus, a relation of connection between the communication apparatus and the host device according to a radiocommunication protocol held in the communication apparatus is used, communication setting information on the external communication network held in the communication apparatus is used to set a relation of connection between the communication apparatus and the external communication network according to an external communication protocol, and a relation of connection between the communication apparatus and the host device and between the communication apparatus and the external communication network are used to transfer data between the external communication network and the host device.

9 Claims, 7 Drawing Sheets

COMMUNICATION DEVICE AND COMMUNICATION METHOD

TECHNICAL FIELD

The present invention relates to a communication apparatus and method for data communication with an external communication network by a short-range radiocommunication based on the Bluetooth system for example.

BACKGROUND ART

In the recent field of radiocommunication system, radiocommunication systems have been developed which adopt the "Bluetooth" (will be referred to as "BT" hereunder) system for data transfer between communication devices by frequency hopping of a radio wave included in a 2.4 GHz band.

The "BT" is a code name of a new industrial standard for implementation of radiocommunication between devices such as a mobile device, computer, hand-held computing device, mobile telephone, head set and a wearable computer, PC peripheral devices such as a printer etc., and human interface devices such as data pad, mouse, etc. The BT system has been developed through a collaboration of telecommunication, networking and similar industries to implement an ad-hoc radio frequency (RF) networking between a plurality of personal computers and devices. The BT system was developed by the Intel, Ericsson, IBM, Nokia and Toshiba (registered trademarks) joining the BT SIG (special interest group) Owing to the BT system, a notebook computer, PDA (personal digital assistant) or mobile telephone can share information and various services with a personal computer by a radiocommunication, and thus there is no necessity for any troublesome cable connection between them. For the BT system, standards for radiocommunication interface and control software were established to assure an interoperability between the devices, and they are disclosed in the "BT (trademark) Special Interest Group, BT Specification Version 1.0".

Referring now to FIG. 1, there is schematically illustrated the whole construction of a conventional radiocommunication system adopting the BT system. The radiocommunication system is indicated with a reference 100. As shown, this radiocommunication system 100 includes a mobile telephone 101, personal computer 102, digital camera 103 and a personal digital assistant (PDA) 104, each having a radiocommunication module 110 by which they are enabled to make mutual data communications with each other.

Also, for dial-up access from the mobile telephone 101 in the radiocommunication system 100 to an Internet network 300 via a mobile network 200, the mobile telephone 101 is connected by the personal computer 102, digital camera 103 and PDA 104 to an Internet service provider 301 in the Internet network 300, and to a WWW (worldwide web) server 302 in the Internet network 300, via the radiocommunication system 100 and mobile network 200.

Thus, the radiocommunication system 100 enables the personal computer 102, digital camera 103 and PDA 104 to wirelessly connect to the Internet network 300, not via the mobile telephone 101 and any cable. Therefore, the radiocommunication system 100 permits to improve the portability of the personal computer 102, digital camera 103 and PDA 104. Also, the radiocommunication system 100 enables the user or subscriber to access the Internet network 300 holding only a terminal like the PDA 104 in hand with the mobile telephone 101 being kept in his or her bag or the like.

Next, the construction of a host device 500 included in the radiocommunication system 100 will be described with reference to FIG. 2. The host device 500 corresponds to the personal computer 102, digital camera 103 or PDA 104 shown in FIG. 1.

As shown in FIG. 2, the host device 500 includes a radiocommunication module 510 corresponding to the radiocommunication module 110 and which controls communication with the outside, and a host controller 530 which controls the host device 500 itself.

The radiocommunication module 510 includes a radiocommunication unit 511 to control radiocommunication within the radiocommunication system 100, an antenna 512 for data communication with each of the components of the radiocommunication system 100, a base-band controller 513 to control the radiocommunication unit 511, and an interface 514 connected by a cable to the host controller 530 for data input and output.

The base-band controller 513 provides a control over the radiocommunication unit 511, including frequency hopping control. Also, the base-band controller 513 converts data to a predetermined format for sending via the radiocommunication module 510, while converting received data in the predetermined format for output to the host controller 530.

The radiocommunication unit 511 includes a receiver 521 to receive radio data from the antenna 512, transmitter 522 to send radio data from the antenna 512, switch 523 to select whether radio data from the transmitter 522 should be sent via the antenna 512 or radio data from the antenna 512 should be provided to the receiver 521, and a hopping synthesizer 524 to generate a local frequency for use in the receiver 521 and transmitter 522 and spread the spectrum by the frequency hopping.

The radiocommunication module 510 further includes a RAM (random-access memory) 516, ROM (read-only memory) 517 and a CPU (central processing unit) 518, each connected to a system bus 515 composed of an address bus and data bus.

The CPU 518 reads, from the ROM 517 via the system bus 515, a control program intended to control each of the components of the radiocommunication module 510, to generate a control signal for controlling each component. At this time, the CPU 518 stores data in the RAM 516 as a work area as necessary to execute the control program. Thereby, the CPU 158 controls the base-band controller 513 and radiocommunication unit 511 to control radiocommunication with other devices included in the radiocommunication system 100, while sending and receiving user data to and from the host controller 530 via the interface 514.

The host controller 530 in the host device 500 includes an interface 531 for input and output of signals from and to the interface 514 in the radiocommunication module 510, a network setting storage 533 to store network setting information such as server address etc. of the Internet service provider 301 when the host device 500 is connected to the Internet, a personal information storage 534 to store personal information such as user ID, mail address, password, etc of each user having the host device 500, and a CPU 535 to control each of these components of the host controller 530. These components of the host controller 530 are connected to a system bus 532. The host controller 530 further includes a power supply 536 which supplies a power to the radiocommunication module 510.

For connection between the host device 500 and Internet network 300, network setting information stored in the network setting information storage 533 and personal information stored in the personal information storage 534 are first provided to the radiocommunication module 510, and then the radiocommunication unit 511 and base-band controller 513 are controlled to make a setting for connection to the Internet network 300 by the CPU 518 in the radiocommunication module 510 by the use of the network setting information and personal information, to thereby establish a connection between the host device 500 and WWW server 302.

For addition of the BT-based radiocommunication function to each component, the latter has to incorporate the radiocommunication module 510 having a BT radiocommunication function. FIG. 3 shows protocol stacks 610 and 620 for the mobile telephone 101 and PDA 104 each having the radiocommunication module 510.

As shown, each of the protocol stacks 610 and 620 has five layers as lower layers to implement the BT-based radiocommunication system 100, including an RF layer for FH and data communications in the 2.4 GHz band, BB (base-band) layer for base-band control, LMP (link manager protocol) layer for handling including connection, disconnection and link, L2CAP (logical link control and adaptation protocol) layer for multiplexing, segmentation and decomposition of various protocols, and RFCOMM layer being a simple transport protocol to emulate the RS-232C serial line.

The mobile telephone 101 and PDA 104 use these five layers for data communications inside the radiocommunication system 100.

Also, the protocol stack 620 has provided above the RFCOMM layer thereof a PPP (point to point protocol) used for dial-up connection to the Internet network 300, an IP (Internet protocol) required for connection to the Internet network 300 and a TCP (transmission control protocol). These protocols are used to send and receive data to and from an application layer (AP).

As in the above, the protocol stack 610 provided in the mobile telephone 101 has the lower five layers similar to those in the protocol stack 620 to implement the BT-based radiocommunication system 100. It also has provided above the RFCOMM layer thereof a data communication mode layer for connection to the mobile network 200. The data communication mode layer includes data communication mode layers for mobile telephone such as a CDMA-ONE (code division multiple access-ONE), W-CDMA (widebandcode division multiple access), etc. Thus, the radiocommunication system 100 uses the higher four layers of the PDA 104 to encapsulate the data by TCP/IP data and sends TCP/IP-encapsulated data to the PDA 104 by the use of the lower five layers, while encapsulating data by TCP/IP received via the mobile telephone 101 to make a connection to the Internet network 300 via the mobile network 200.

However, the method for constructing the radiocommunication system 100 as in the above is not advantageous as will be described below.

That is, an Internet protocol stack (TCP/IP, PPP) to enable a connection to the Internet network 300 via the radiocommunication system 100 has to be installed in the mobile telephone 101, PDA 104, etc. included in the radiocommunication system 100, which will cause the hardware of each of these devices 102 to 104 and software for them to be larger and thus complicate the construction of each of the devices 102 to 104. The Internet protocol stack adds to the costs of manufacturing the devices 102 to 104, and it often is a redundant design for the users who will not access the Internet network 300, for example.

Furthermore, the devices 102 to 104 included in the radiocommunication system 100 as shown in FIG. 2 have to store the network setting information such as address, mail address, password, etc. of the Internet service provider 301 and the personal information in the network setting information storage 533 and personal information storage 534, respectively, since such information is required for access to the Internet network 300.

Therefore, the user has to set network setting information and personal information for each of the devices 102 to 104. With a small portable device having only a man-machine interface function which is not sufficient, the setting of such network setting information and personal information will be very troublesome to the user of such a device. Thus, for easier setting of various information, a complicate man-machine interface has to be installed in each of the devices 102 to 104.

Among others, when selecting another Internet service provider 301, settings for access to the network have to be changed for each of the devices 102 to 104 included in the radiocommunication system 100.

DISCLOSURE OF THE INVENTION

Accordingly, the present invention has an object to overcome the above-mentioned drawbacks of the prior art by providing a communication apparatus and method capable of easily making a network setting for connection of each host device included in a radiocommunication system to an Internet network or the like.

The above object can be attained by providing a communication apparatus including a radiocommunication means for sending and receiving data to and from a host device via a radiocommunication network, an external communication means for connection to a communication network outside the radiocommunication network to sen and receive data to and from the external communication network, a storage means for storing a radiocommunication protocol for use to send and receive data within the radiocommunication network, an external communication protocol for use to send and receive data to and from the external communication network, and communication setting information on the external communication network, and a communication controlling network for controlling the external communication means by the use of communication setting information stored in the storage means to set a connection with the external communication network according to the external communication protocol, while controlling the radiocommunication means to set a connection with the host device according to the radiocommunication protocol stored in the storage means, thereby controlling the radiocommunication means and external communication means to transfer data between the external communication network and host device.

Also, the above object can be attained by providing a communication method for transferring data between a host device and communication apparatus via a radiocommunication network, while transferring data between an external communication network outside the radiocommunication network and the communication apparatus comprising the steps of setting a relation of connection between the communication apparatus and host device according to a radiocommunication protocol held in the communication apparatus, while setting a relation of connection between the communication apparatus and external communication network according to an external communication protocol by a use of communication setting information on the external communication network, held in the communication apparatus, and transmitting and receiving data between the external communication network and host device by a use of the relation of connection between the communication apparatus and host device and that the relation of connection between the communication apparatus and external communication network.

BEST MODE FOR CARRYING OUT THE INVENTION

These objects and other objects, features and advantages of the present invention will become more apparent from the following detailed description of the preferred embodiments of the present invention when taken in conjunction with the accompanying drawings.

Figure 1:
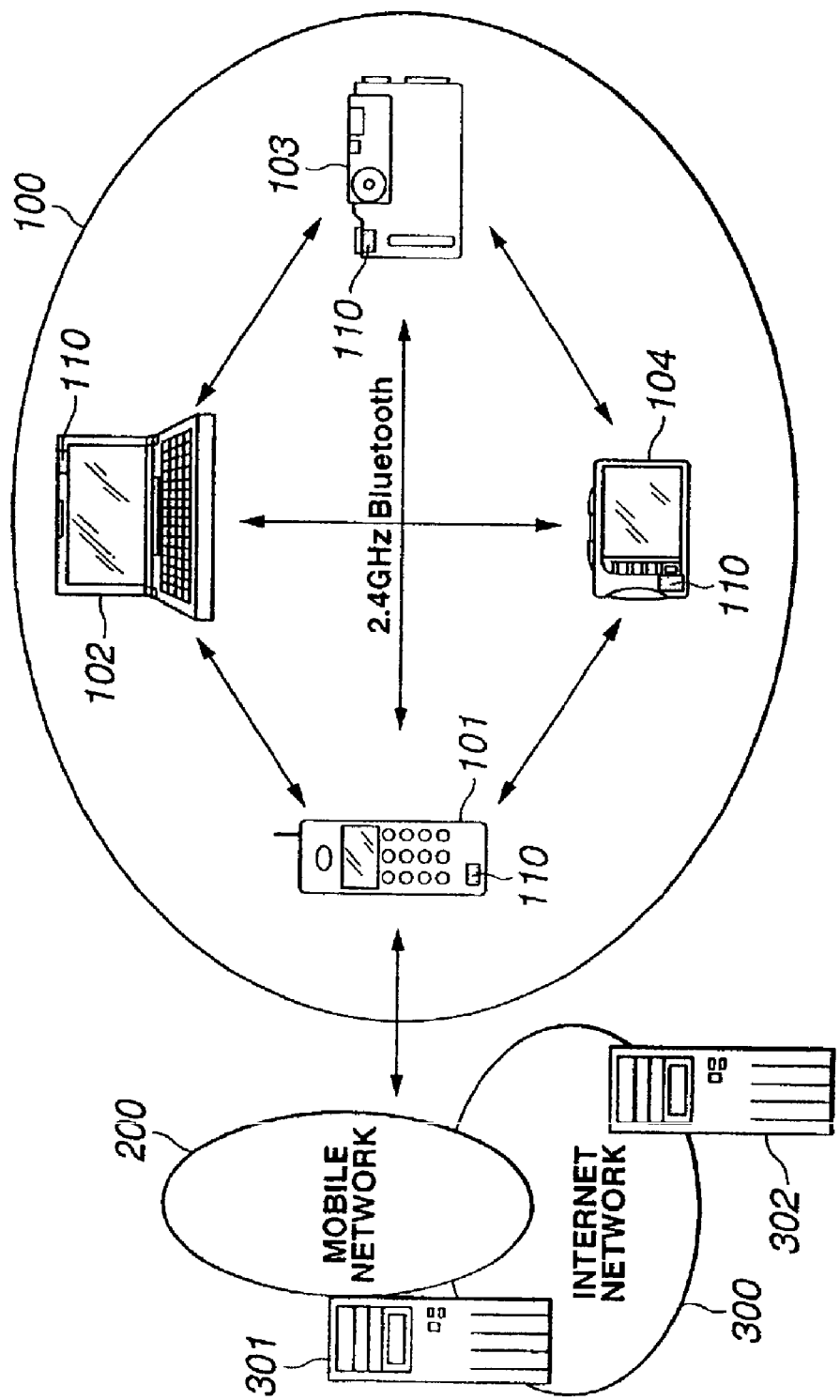
FIG. 1 schematically illustrates the whole construction of a conventional radiocommunication system.
Figure 2:
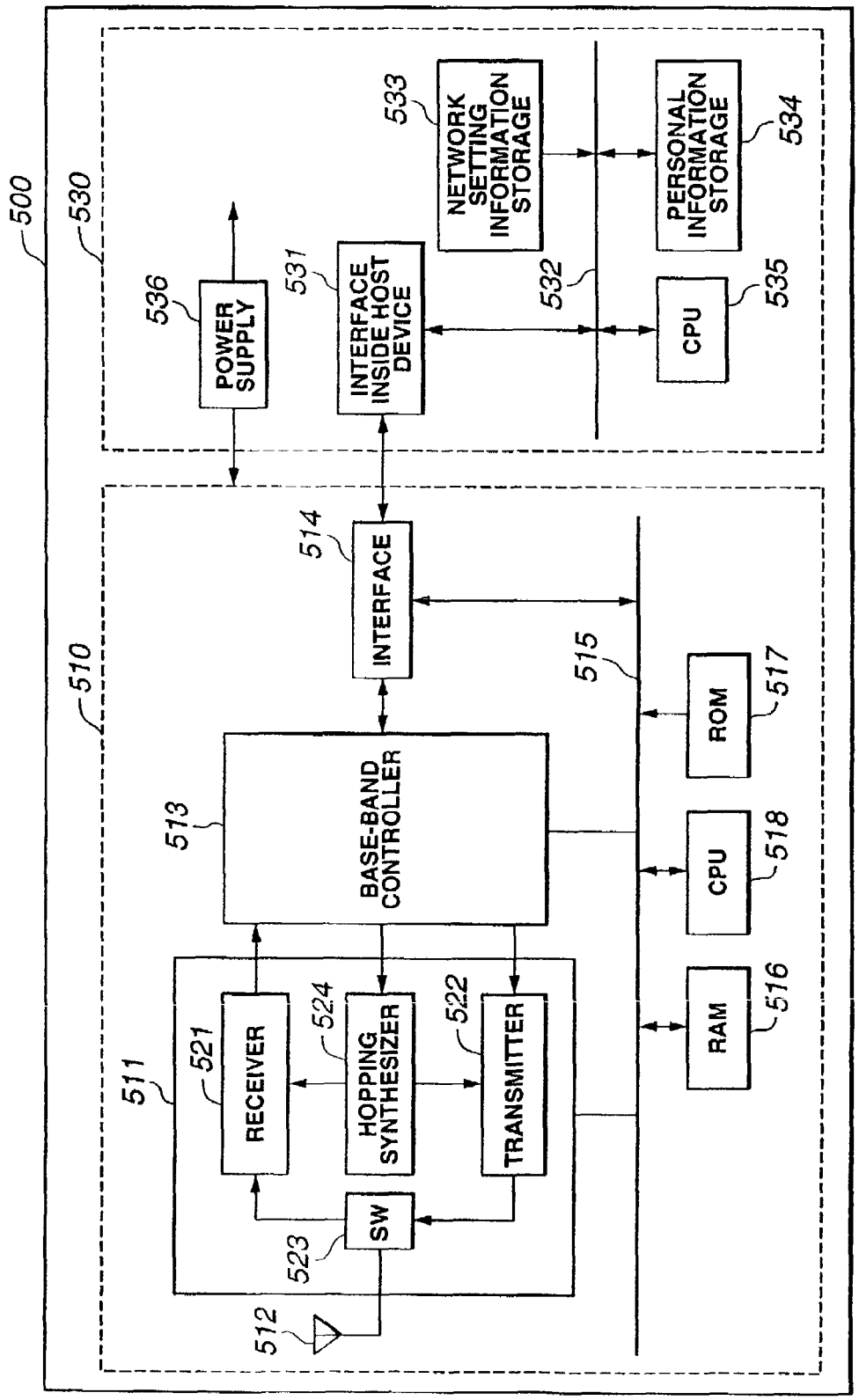
FIG. 2 is a block diagram of a host device included in the conventional radiocommunication system.
Figure 3:
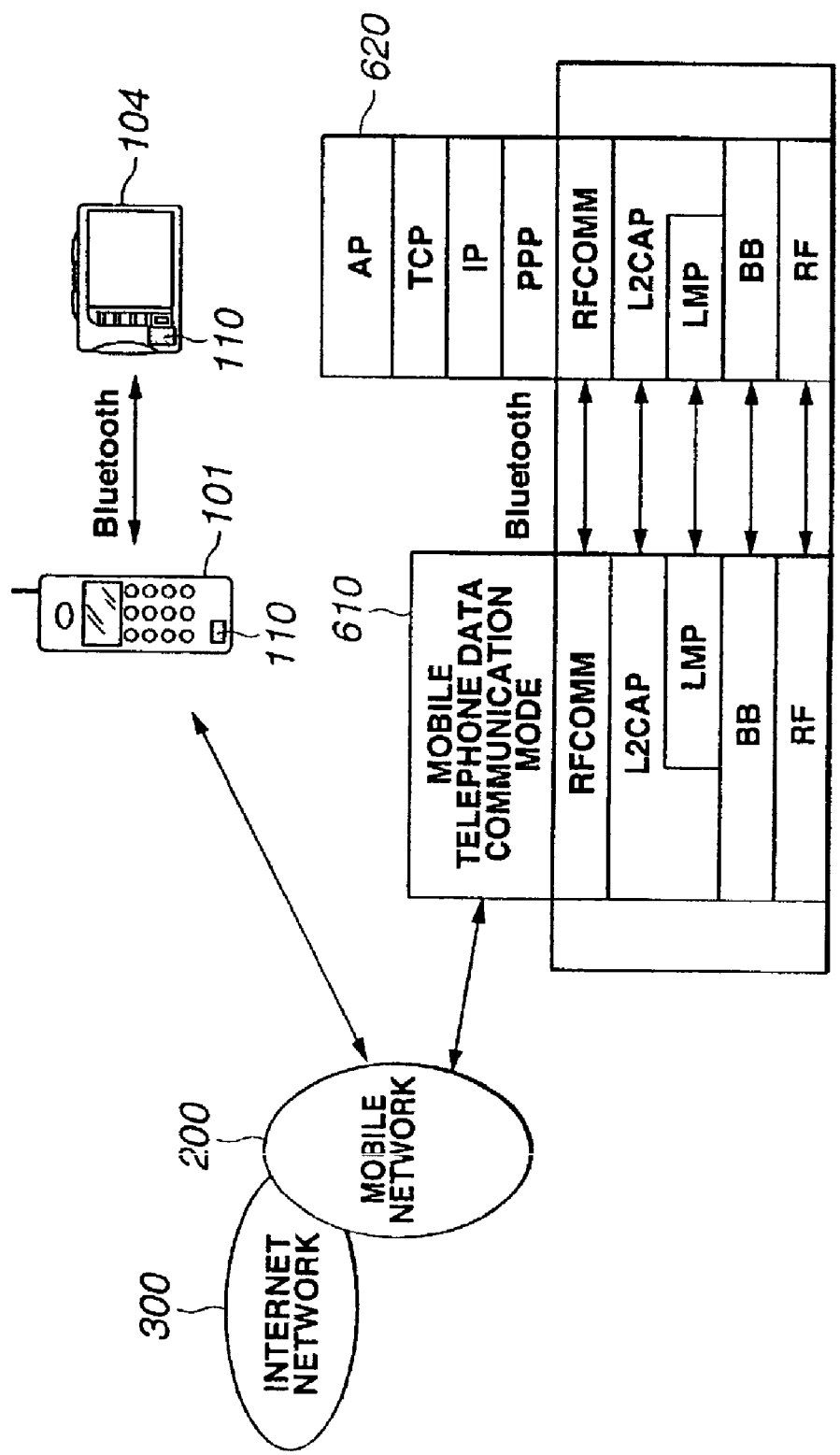
FIG. 3 explains protocol stacks for a mobile telephone and host device, respectively, included in the conventional radiocommunication system.
Figure 4:
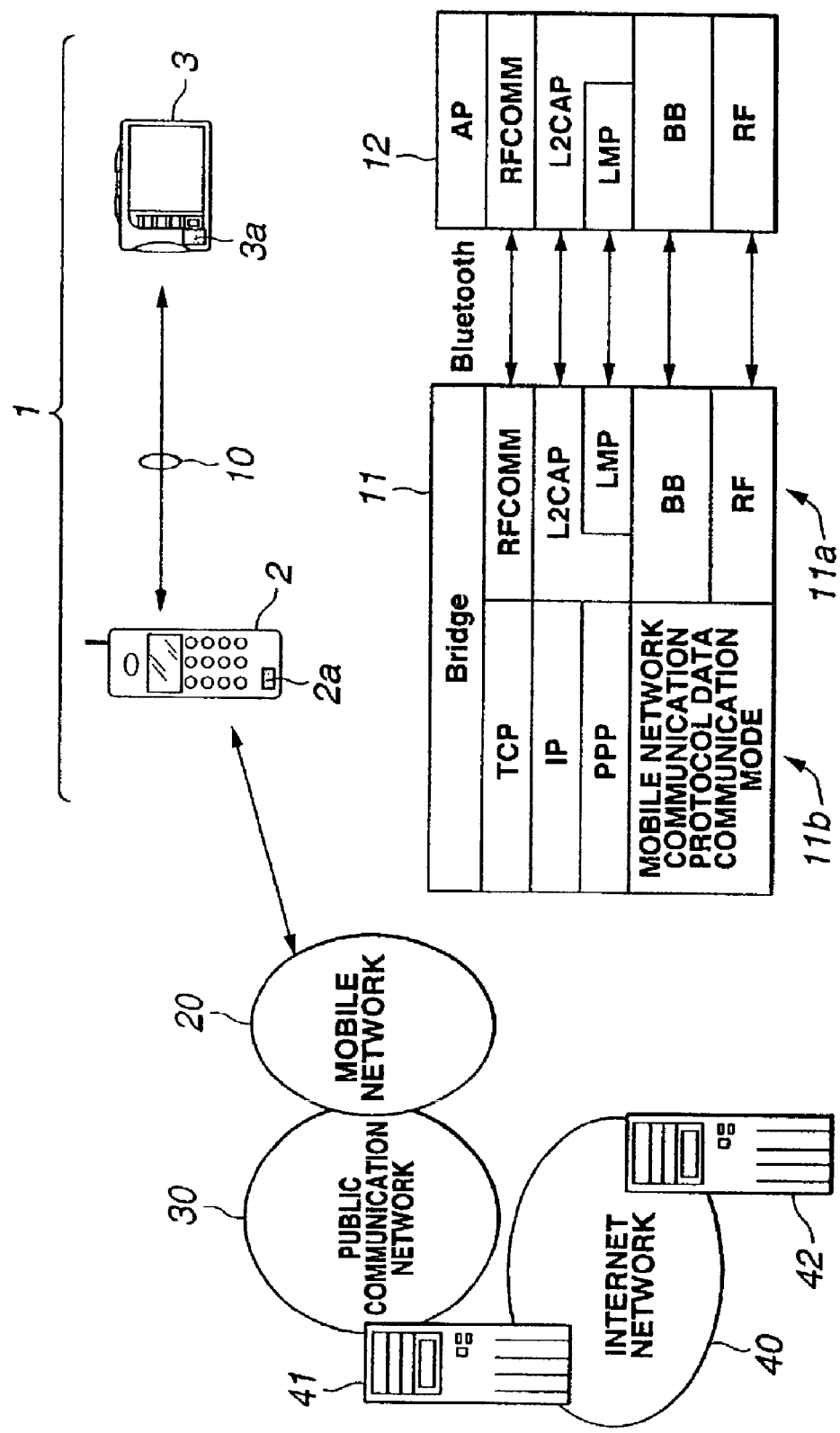
FIG. 4 schematically illustrates the construction of the radiocommunication system according to the present invention, relation between the radiocommunication system and external communication network, and a protocol stack for the radiocommunication device and host device included in the radiocommunication system.

Referring now to FIG. 4, there is schematically illustrated the construction of the radiocommunication system according to the present invention. The radiocommunication system is generally illustrated with a reference 1.

As shown, the radiocommunication system 1 adopts the Bluetooth system (will be referred to as "BT" hereunder) to implement data communication between a radiocommunication device 2 serving as a gateway and a host device 3.

The BT system is a name of a short-range radiocommunication technique whose standardization was started in May, 1998 by the five European and Japanese industries having previously been described. Based on this BT system, a short-range radiocommunication network whose maximum data transfer rate is 1 Mbps (effectively, 721 kbps) and maximum sending distance is on the order of 10 m is organized for data communications. According to the BT system, 79 channels whose bandwidth is 1 MHz are set in an ISM (industrial scientific medical) frequency band in the 2.4 GHz band which can be used with no official permission to send and receive radio data between the radiocommunication device 2 and host device 3 by the use of the spread spectrum technique by the frequency hopping in which a channel is switched 1600 times per sec.

In a short-range radiocommunication network 10 adopting the BT system, there is employed a slave/master system consisting of a master device determining a frequency hopping pattern and a slave device being a communication counterpart controlled by the master device, differentiated based on operations these devices will effect. The master device can make simultaneous data communications with seven slave devices. A subnet composed of a total of eight devices including one master device and seven slave devices is called "piconet", the host device 3 taken as a slave device, included in th piconet, that is, in the radiocommunication system 1, can be a slave device of more than two piconets at a time.

As shown in FIG. 4, the radiocommunication system 1 includes, for example, the radiocommunication device 2 for data communications with an Internet network 40, public communication network 30, and mobile network 20, and also for sending and receiving radio data to and from the host device 3 via the short-range radiocommunication network 10, and the host device 3 for sending and receiving packets including user data etc. to and from the radiocommunication device 2.

The host device 3 is an electronic device wirelessly connected to the radiocommunication device 2 via the short-range radiocommunication network 10 and which is operated by the user. The host device 3 includes, for example, a PDA (personal digital assistant), digital camera, mailing processing terminal, EMD (electronic music distribution) terminal or the like. The host device 3 has installed therein a BT module 3a to send and receive data to and from the radiocommunication device 2 inside the radiocommunication system 1 on the basis of the BT system. The BT module 3a has a protocol for BT-based data communications with the radiocommunication device 2, and a module to execute the protocol.

The host device 3 is operated by the user, for example, to generate operation input signal. The host device 3 generates an operation input signal for a connection to the radiocommunication device 2 via the short-range radiocommunication network 10 for example and sends a control command based on the operation input signal to the radiocommunication device 2, to set a relation of connection to the radiocommunication device 2 via the short-range radiocommunication network 10. When the radiocommunication device 2 connects to the public communication network 30, the host device 3 will connect to the public communication network 30 and Internet network 40 via the short-range radiocommunication network 10 and mobile network 20.

The radiocommunication device 2 is connected to the host device 3 via the short-range radiocommunication network 10, while being connected to the mobile network 20, public communication network 30 and Internet network 40. That is, the radiocommunication device 2 serves as a gateway for making a connection between the host device 3 and Internet network 40. The radiocommunication device 2 has installed therein a BT module 2a to send and receive data to and from the host device 3 inside the radiocommunication system 1 on the basis of the BT system. The BT module 2a has a protocol for BT-based data communications with the host device 3, and a module to execute the protocol.

The radiocommunication device 2 includes, for example, a personal computer with a modem for use to connect to the public communication network 30, a mobile telephone adopting for example CDMA-one (code division multiple access-one) or W-CDMA (wideband-code division multiple access) method, TA/modem, STB (set top box), quasi-public communication system such as a BT-based base station, a radio terminal using the HDR (high data rate) system which is a wireless Internet access system proposed by the Qualcomm or the like.

The public communication network 30 includes, for example, the Internet network 40 connected to a personal computer via a telephone line, a mobile network 20 connected to a mobile telephone, an ISDN (integrated services digital network)/B (broadband)-ISDN connected to a TA/modem, a satellite broadcasting network connected to an STB, WLL (wireless local loop) connected to a quasi-public communication network or the like.

The Internet network 40 includes the Internet service provider 41 and WWW server 42 as well as an information server, mail server, EMD server and a community server.

The information server receives a request from the host device 3 via the radiocommunication device 2, and sends information corresponding to the request to the host device 3. Also, the mail server manages the electronic mail to send and receive an electronic mail to and from the host device 3 via the radiocommunication device 2. Further, the EMD server sends music information to an EMD terminal of the host device 3 via the radiocommunication device 2 to manage the music distribution service. Moreover, the community server serves, for example, town information and news information download service to the digital camera being the host device 3, and manages uploading of information etc. from the host device 3.

Next, the present invention will further be described concerning the radiocommunication system 1 composed of only the radiocommunication device 2 and host device 3 which sends and receives packets on the basis of the BT system to and from the radiocommunication device 2, for the simplicity of the illustration and explanation as shown in FIG. 4.

Protocol stacks 11 and 12 installed in the radiocommunication device 2 and host device 3, respectively, included in the radiocommunication system 1 will be described herebelow.

Each of the radiocommunication device 2 and host device 3 has installed therein, as lower layers, five protocols including an RF layer for making FH and data transfer in the 2.4 GHz band, BB (base-band) layer for base-band control, LMP (link manager protocol) layer for connection, disconnection and link handling, L2CAP (logical link control and adaptation protocol) layer for multiplexing, segmentation and decomposition of various protocols, and an RFCOMM layer being a simplified transport protocol for emulation of the RS-232C serial line. These protocols are intended for implementation of the BT-based radiocommunication system 1.

The host device 3 has installed therein, as higher layers, an RF, BB, LMP, L2CAP and RECOMM layers, intended for BT-based transfer of radio data to and from the radiocommunication device 2 via the short-range radiocommunication network 10, and also an application (AP) layer as a higher layer.

The radiocommunication device 2 has installed therein a protocol stack 11a for connection to the host device 3 via the short-range radiocommunication network 10, and a protocol stack 11b for connection to the mobile network 20, public communication network 30 and Internet network 40 existing outside the short-range radiocommunication network 10. The radiocommunication device 2 has five lower layers including RF, BB, LMP, L2CAP and RFCOMM layers installed in the protocol stack 11a.

The radiocommunication device 2 has also mobile communication protocols such as W-CDMA (wideband-code division multiple access) protocol installed in the protocol stack 11b. The radiocommunication device 2 has installed therein for example a W-CDMA protocol as a mobile communication protocol, and connects to the mobile network 20 and selects a data communication mode to have a connection to the public communication network 30 via the mobile network 20. The radiocommunication device 2 has installed therein above the mobile communication protocol in the protocol stack 11b a PPP (point to point protocol) positioned in a link layer for connection to the Internet network, IP (Internet protocol) positioned in a network layer, and a TCP (transmission control protocol) positioned in a transport layer.

Furthermore, the radiocommunication device 2 has installed therein above the protocol and protocol stacks 11a and 11b thereof a bridge via which the device 2 transfers data between the protocol stacks 11a and 11b.

Since the lower layers of the protocol stack 11a of the radiocommunication 2 correspond to those of the protocol stack 11b of the host device 3, radio data is transferred between the radiocommunication device 2 and host device 3 on the basis of the BT system. The radiocommunication device 2 sends and receives packets to and from the RFCOMM layers installed in itself and host device 3, respectively.

In the radiocommunication system 1, when user data generated at the AP in the host device 3 is sent from the radiocommunication device 2 to the Internet network 40 the host device 3 operates according the lower layers in the protocol stack 12 to send radio data to the radiocommunication device 2. Next, the radiocommunication device 2 operates according to each of the protocols in the lower layers in the protocol stack 11a to receive user data and bridges it to the TCP in the protocol stack 11b via the bridge. Further, the radiocommunication device 2 adds a header according to the TCP/IP to the user data in each of the TCP and IP in the protocol stack 11b to encapsulate the user data, and processes the user data according to the mobile communication protocol to send a TCP/IP packet, thereby sending the packet to the Internet service provider 41 and then to the Internet network 40 via the mobile network 20 and public communication network 30.

Also, in the radiocommunication system 1, when data from the Internet network 40 is received by the host device 3, the TCP/IP packet sent via the Internet network 40, public communication network 30 and mobile network 20 are received by the radiocommunication device 2. The radiocommunication device 2 processes the TCP/IP packet according to the mobile communication protocol, IP and TCP to remove the header from the TCP/IP packet, thereby extracting the data. Then, the radiocommunication device 2 bridges the extracted data from the protocol stack 11b to the protocol stack 11a, processes it according to the lower layers of the protocol stack 11a, and sends it to the host device 3. Thereby, in the radiocommunication system 1, the data from the Internet network 40 is received by processing it according to the lower 5 layers of the host device 3.

Figure 5:
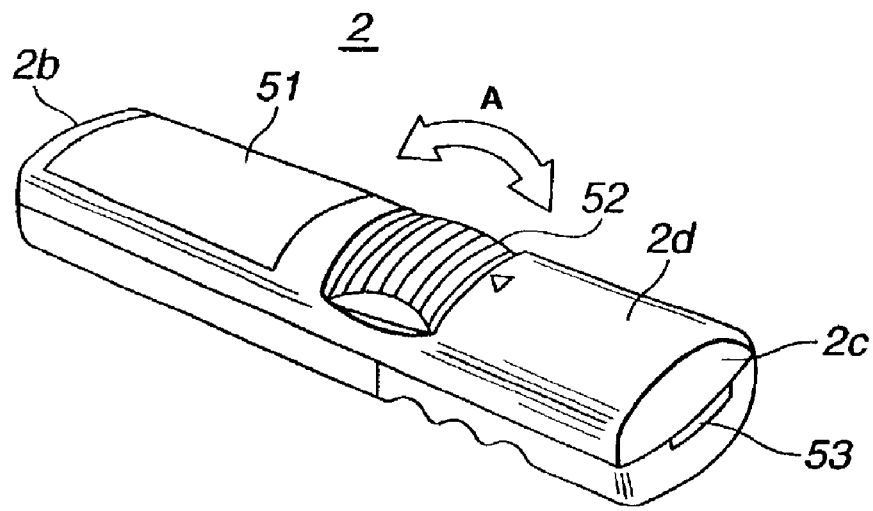
FIG. 5 is a perspective view of the radiocommunication device according to the present invention.
Figure 6:
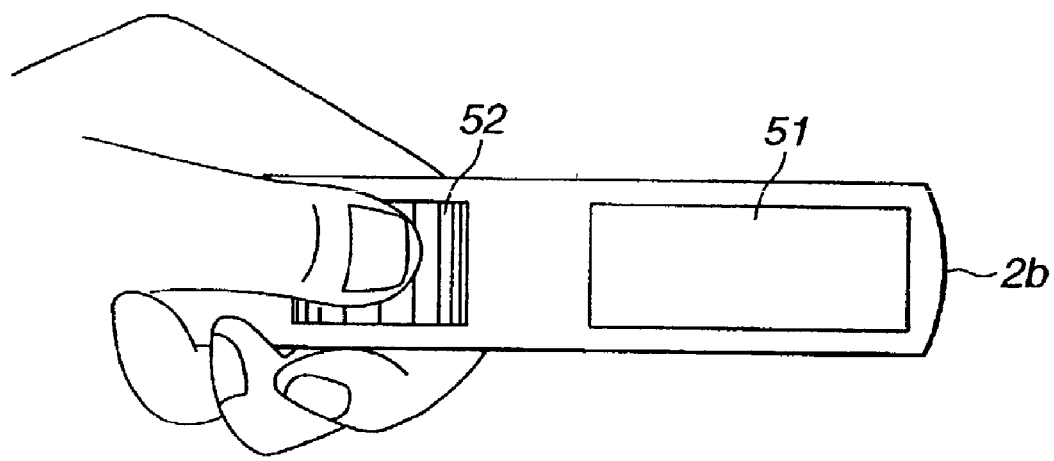
FIG. 6 is a plan view of the radiocommunication device in FIG. 5.

The radiocommunication device 2 included in the aforementioned radiocommunication system 1 has an appearance as shown in FIG. 4, but it may be a one shown in FIGS. 5 and 6.

As shown in FIG. 5, the radiocommunication device 2 has a generally cylindrical body having a display unit 51 and operation unit 52 provided on one side 2d thereof. The display unit 51 and operation unit 52 are provided in the order from one end 2b towards the other end 2c of the body. The radiocommunication device 2 has provided at the end 2b thereof an antenna via which data is sent to and received from the host device 3 and mobile network 20, and at the end 2c a slot 53 into which a card is to be inserted.

The display unit 51 is formed from a liquid crystal display for example to display various contents. The display unit 51 displays for example user data the radiocommunication device 2 sends to and receives from the host device 3, operations effected at the radiocommunication device 2, data for control of the operations of the radiocommunication device 2 and host device 3, information on a card inserted in the card slot 53.

The operation unit 52 is for example a rotary dial the user can rotate in the directions of arrow A in FIG. 5. The rotary dial as the operation unit 52 can also be depressed towards the center of rotation. The operation unit 52 is operated by the user to produce operation input signals to control operations of the radiocommunication device 2.

The card slot 53 has such a depth that a card can be inserted. The card slot 53 receives for example a memory card having stored therein user data such as images, music pieces, etc. or a function card to impart various functions to the radiocommunication device 2. The card slot 53 is internally provided with a terminal (not shown) for mechanical connection to a card inserted therein for input and output of signals. A card inserted in the card slot 53 supplies and receives signals to and from the radiocommunication device 2. The terminal provided inside the card slot has 10 pins for example as specified in the serial interface standard.

More specifically, the card slot 53 provides a serial interface which can access for example the Memory Stick (trade name). That is, the card slot 53 has a plurality of terminals for input and output of bus state, data, clock, etc. indicating the state of the serial bus when the card is connected to the radiocommunication device 2. A card for use as inserted in the card slot 53 may be a one having the same shape and specifications as those of any existing memory card incorporating a flash memory and adopting the serial protocol as the interface. Namely, the memory card for insertion into the card slot 53 has an enclosure of 50.0 mm in length, 2.5 mm in width, and 2.8 mm in thickness for example and in which a flash memory and memory controller are enclosed. In this radiocommunication device 2, only three of the 10 pins are used for the data, clock and bus state, respectively, and a half duplex transfer of data is effected bidirectionally.

The above radiocommunication device 2 has such a size as the user can hold in the hand as shown in FIG. 6. By operating the operation unit 52 with the thumb, the user can change contents displayed on the display unit 51 and produce operation input signals indicative of sending and reception of data and command to and from the host device 3 via the short-range radiocommunication network 10.

Figure 7:
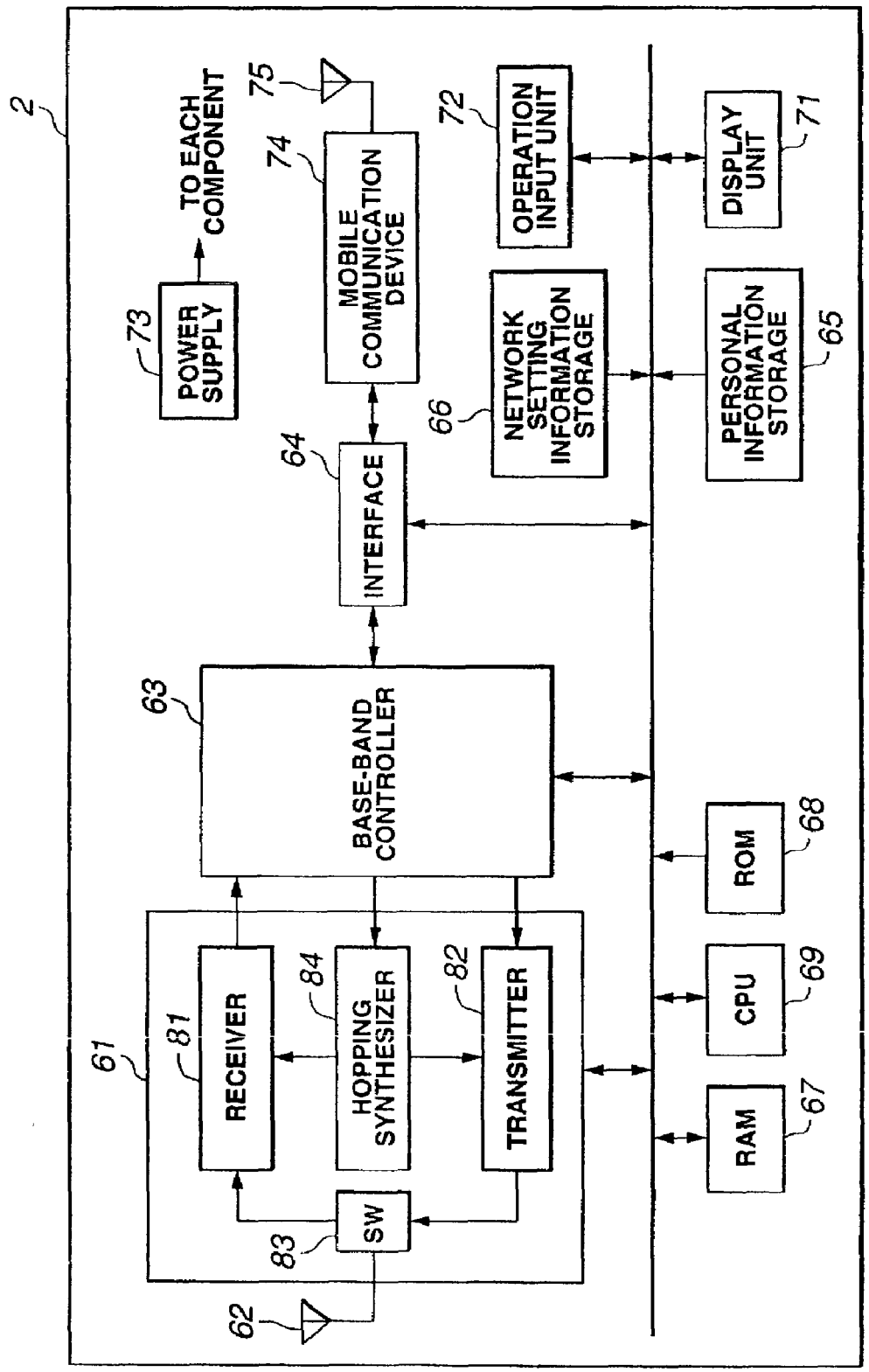
FIG. 7 is a block diagram of the radiocommunication device in FIG. 5.

Referring now to FIG. 7, there is illustrated in the form of a block diagram the radiocommunication device 2 included in the radiocommunication system 1. In FIG. 7, other than a mobile communication device 74 and external communication antenna 75, which will further be described later, corresponds to the BT module 2a.

As shown in FIG. 7, the radiocommunication device 2 includes a radiocommunication unit 61 for sending and reception of radio data which is sent and received by the radiocommunication system 1, radiocommunication antenna 62 for sending and reception of radio data to and from each of component devices composting the radiocommunication system 1, and a base-band controller 63 to control the communications effected in the radiocommunication unit 61.

In case the radiocommunication device 2 is designed to have the appearance as shown in FIG. 5, the radiocommunication antenna 62 is provided at the one end 2b of the radiocommunication device 2. The radiocommunication antenna 62 consists of an antenna to send and receive radio data whose frequency is included in the 2.4 GHz band (2.402 to 2.480 GHz). The radiocommunication antenna 62 sends radio data from the radiocommunication unit 61 to the host device 3 via the short-range radiocommunication network 10, while receiving radio data from the host device 3 via the short-range radiocommunication network 10 and providing it to the radiocommunication unit 61.

The radio data sent and received by the radiocommunication antenna 62 via the short-range radiocommunication network 10 is of a predetermined number of bits, and sent and received as a packet consisting of user data and control data. The packet is the smallest unit of data thus sent and received.

As shown in FIG. 7, the radiocommunication unit 61 includes a receiver 81 to receive radio data coming from the radiocommunication antenna 62, a transmitter 82 to send radio data from the radiocommunication antenna 62, a switch 83 to select whether radio data from the transmitter 82 is to be sent via the radiocommunication antenna 62 or whether radio data from the radiocommunication antenna 62 is to be provided to the receiver 81, and a hopping synthesizer 84 to make spread spectrum, by the frequency hopping, of radio data from the receiver 81 and transmitter 82.

The switch 83 operates in response to a control signal from a radiocommunication CPU (central processing unit) 69 which will further be described later. When radio data is received by the radiocommunication antenna 62, the switch 83 will operate to provide the radio data from the radiocommunication antenna 62 to the receiver 81. When radio data is sent from the radiocommunication antenna 62, the switch 83 will operate to provide the radio data from the transmitter 82 to the radiocommunication antenna 62.

The receiver 81 is supplied with radio data from the switch 83, and provides it to the base-band controller 63. The hopping synthesizer 84 designates a hopping frequency pattern, and the receiver 81 removes a carrier in the 2.4 GHz band according to a frequency pattern which will be when radio data is received, converts the radio data to data of 0 and 1 and provides the 0 and 1 data to the base-band controller 63. At this time, the receiver 81 multiplies the data by a frequency pattern designated in packets by the hopping synthesizer 84 to remove the carrier from the radio data and provides the radio data to the base-band controller 63.

The transmitter 82 is supplied with radio data of 0 and 1 in packets, having been generated by the base-band controller 63 and subjected to a primary modulation, as radio data which is provided to the mobile telephone 2 or radiocommunication device 3 from the antenna 62 via the short-range radiocommunication network 10, and provides the data to the switch 83. The radio data is supplied from the radiocommunication antenna 62 to the host device 3 via the short-range radiocommunication network 10. The hopping synthesizer 84 designates a frequency pattern, and the transmitter 82 generates radio data on which a carrier in the 2.4 GHz band is superposed according to the designated frequency pattern, and provides the radio data to the switch 83. At this time, the transmitter 82 superposes, in packets, the carrier on the radio data according to the frequency pattern designated by the hopping synthesizer 84, and sends the radio data.

The base-band controller 63 designates a hopping pattern for the frequency hopping by the hopping synthesizer 84. The hopping synthesizer 84 is controlled by the base-band controller 63 to designate the same frequency pattern to both the receiver 81 and transmitter 82.

When receiving radio data from the antenna 62, the hopping synthesizer 84 changes the frequency of a carrier to be removed by the receiver 81, for each slot according to a frequency pattern designated by the base-band controller 63.

Also, when sending radio data from the radiocommunication antenna 62, the hopping synthesizer 84 changes the frequency of a carrier to be superposed on the data by the transmitter 82, for each slot according to a frequency pattern intended to change the frequency of data from the base-band controller 63 by the transmitter 82.

The hopping synthesizer 84 controls the frequency for a frequency hopping at 1600 times per sec on 79 channels (2.402 to 2.480 GHz) with an interval of 1 MHz between two successive ones thereof for example.

The base-band controller 63 is supplied with radio data in packets from the receiver 81 and demodulates the radio data having been subjected to a frequency modulation by a frequency hopping. For sending radio data from the radiocommunication antenna 62, the base-band controller 63 makes a primary modulation of data to be sent and provides it to the transmitter 82.

Further, the base-band controller 63 gives a hopping pattern to the hopping synthesizer 84 to control the latter. Thereby, the base-band controller 63 controls the sending timing for radio data to be sent from the radiocommunication device 2 while controlling the reception timing of radio data to be received. The base-band controller 63 gives a frequency pattern of f(k), f(k+1), f(k+2), . . . , for example as a hopping pattern to the hopping synthesizer 84 at every predetermined time.

Moreover, the base-band controller 63 converts data to be sent to a predetermined packet format according to a control signal from the radiocommunication CPU 69 and provides it in packets to the receiver 81, while decomposing a packet having the predetermined packet format from the transmitter 82 and providing the decomposed packet to the radiocommunication CPU 69 via a system bus 70.

Furthermore, the base-band controller 63 has a function to change the output from the transmitter 82. It is supplied with information indicative of a distance between the radiocommunication device 2 and host device 3 from the radiocommunication CPU 69 to control the output power of radio data generated by the transmitter 82.

The radiocommunication device 2 further includes a personal information storage 65 to store personal information given for each user, and a network setting storage 66 to store network setting information necessary for the host device 3 to connect to the public communication network 30, Internet network 40, etc.

The personal information storage 65 stores personal information including the mail address of a user of the host device 3, user ID and password (for connection of PPP) intended to connect to an access point, etc. These data are read into the personal information storage 65 and the content of the latter is controlled, by the radiocommunication CPU 89.

Further, for sending radio data generated by an electronic mail application for example, the personal information storage 65 may store information indicative of a list of electronic mail addresses (address note) of electronic mail destinations, information indicative of sending and reception history, information indicating a list of repetitive sentences for simple input to the host device 3 (for example, digital camera) having no sufficient character input functions, signature information to be added to the end of a sent electronic mail sentence, information indicative of a mail unique address to differentiate between a received but not yet read electronic mail and a received and already read mail.

Furthermore, the personal information storage 65 may store SIM (subscriber identification module) information. The SIM information stored in the personal information storage 65 is information necessary to differentiate between users, intended for an improved security and having been encrypted inside the radiocommunication device 2. The SIM information includes for example the above-mentioned user ID, user password, mail ID for access to a personal mail box, mail password, user's mail address, personal authentication password for conforming the right of using the radiocommunication device 2 itself, etc. all encrypted.

The network setting storage 66 stores, as network setting information, server address, telephone number of a access point, etc. required for dial-up connection of the host device 3 to the Internet service provider 41 of the Internet network 40. The information is read into the network setting storage 66 and the content of the latter is controlled, by the radiocommunication CPU 69.

The radiocommunication device 2 also includes an interface 64, mobile communication device 74 which operates according to the mobile communication protocol in the protocol stack 11b, and an external communication antenna 75 which sends and receives radio data to and from the mobile communication network 20.

The interface 64 is connected to the system bus 70, and provides radio data from the mobile communication device 74 to the base-band controller 63 on the basis of a control signal from the radiocommunication CPU 69 and data from the base-band controller 63 to the mobile communication device 74.

Also, the interface 64 is provided with a plurality of signal input/output terminals which can be put into contact with the terminals of a card inserted in the card slot 53 for input and output of signals. The interface 64 provides data to and is supplied with data from makes data transfer to and from an external memory module installed in the card slot 53 and having a memory function.

The interface 64 has 10 pins as signal input/output terminals for example, and supplies data and is supplied with data from the external memory module according to the serial data input/output standard. That is, when the external memory module is inserted in the card slot 53, the interface 64 inputs and outputs bus state indicative of the state of the serial bus, data, clock, etc. to make data input/output.

The radiocommunication device 2 further includes a RAM (random-access memory) 67, ROM (read-only memory) 68 and the radiocommunication CPU 69.

The radiocommunication CPU 69 generates a control signal by loading, from the ROM 68 via the system bus 70, a control program which controls each of the components of the radiocommunication device 2. The radiocommunication CPU 69 stores data taking the RAM 67 as a work area when necessary, and executes the control program to generate a control signal. Thereby, the radiocommunication CPU 69 controls the base-band controller 63, radiocommunication unit 61 and interface 64 to generate a packet for controlling the communication with any other one of the components of the radiocommunication system 1, data input to and data output from the external memory module via the interface 64, data transfer to and from the mobile network 20 via the mobile communication unit 74.

Further, the radiocommunication device 2 includes a display unit 71 corresponding to the display unit 51 shown in FIG. 5, operation input unit 72 corresponding to the operation unit 52, and a power supply 73 which supplies a power to each of the components of the radiocommunication device 2.

According to controls signals from the radiocommunication CPU 69, the display unit 71 displays, to the user, operations of the radiocommunication CPU 69 and content of data transferred via the interface 64.

The operation input unit 72 is operated by the user to generate an operation input for delivery to the radiocommunication CPU 69. The radiocommunication CPU 69 executes the control program according to the operation input signal from the operation input unit 72 while changing the display on the display unit 71.

The above-mentioned radiocommunication device 2 and host device 3 are in a master/slave relation. The host device 3 is the master while the radiocommunication device 2 is the slave. Even for sending user data from the radiocommunication device 2 to the host device 3 for example, the radiocommunication device 2 can send radio data to the host device 3 only when it has received a packet informing that the right of sending to the host device 3 has been acquired. Also, in the radiocommunication system 1, the radiocommunication device 2 operated by the user will serve as the master device while the host device 3 will be the slave device.

When a request for connection to the Internet network 40 is made from the host device 3 to the above radiocommunication device 2, the radiocommunication CPU 69 first reads the personal information from the personal information storage 65 and network setting information from the network setting storage 66 via the system bus 70, and stores the information once into the RAM 67. Next, the radiocommunication CPU 69 controls the radiocommunication unit 61 and base-band controller 63 to make operations according to the lower five layers in the protocol stack 11a, thereby establishing a relation of connection with the host device 3 via the BT-based short-range radiocommunication network 10. Then, the radiocommunication CPU 69 utilizes the relation of connection via the short-range radiocommunication network 10 and makes operations according to the PPP, IP, TCP and mobile communication protocol, respectively, of the protocol stack 11b by the use of the network setting information and personal information stored in the RAM 67, thereby connecting the host device 3 and Internet network 40 to each other.

Figure 8:
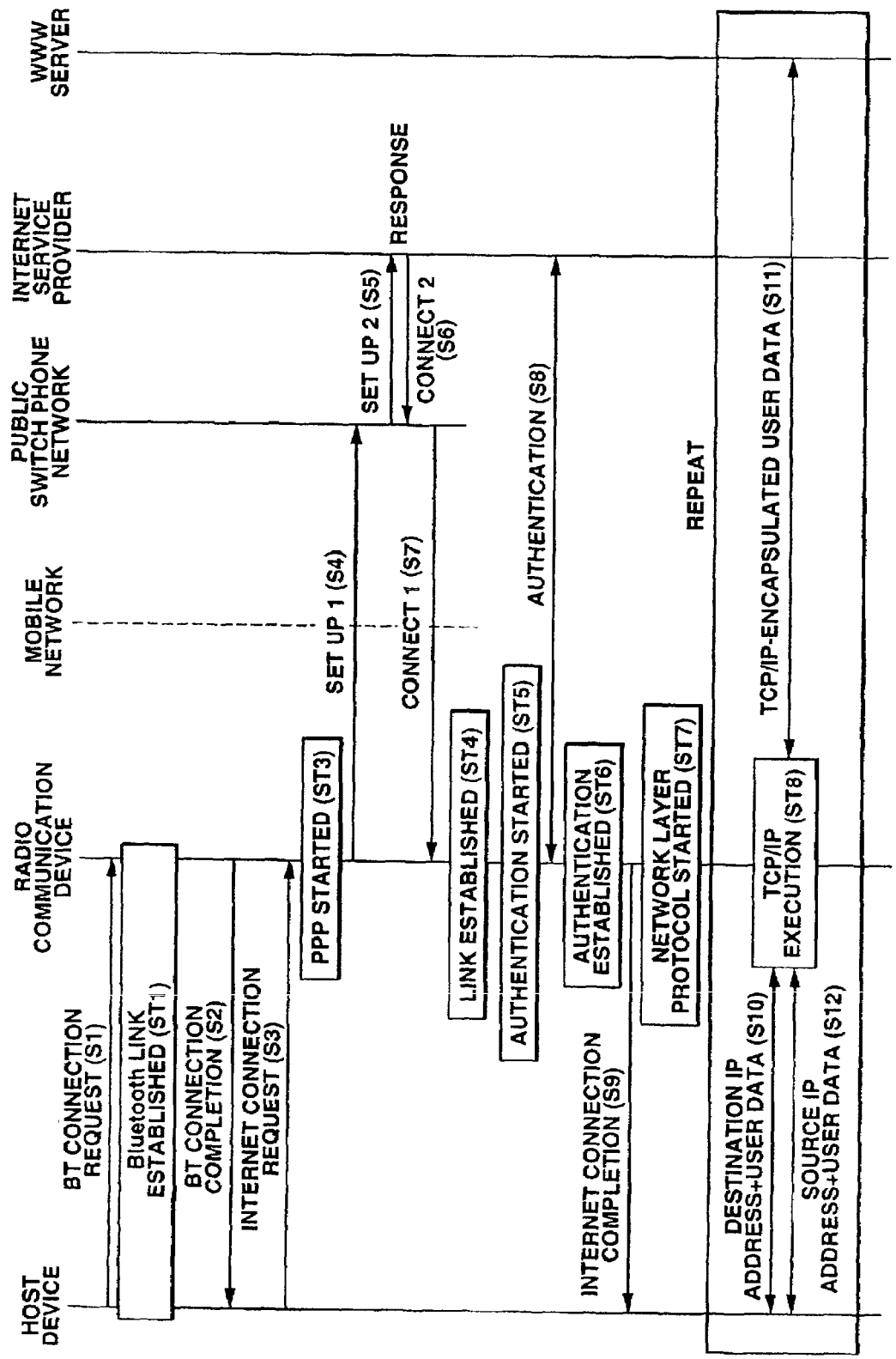
FIG. 8 explains the sequence of controlling mutual communications effected between the radiocommunication device according to the present invention, host device, mobile network, public communication network, Internet service provider and WWW server.

Next, a procedure for transferring user data between the host device 3 and Internet network 40 with the relation of connection established between them in the above radiocommunication system 1, will be described with reference to FIG. 8. FIG. 8 explains the sequence of controlling mutual communications effected between the six components including the host device 3, radiocommunication device 2, mobile network 20, public communication network 30, Internet service provider 41 and WWW server 42.

As shown in FIG. 8, first, when an operation input signal requesting a connection with the Internet network 40 is generated by the user operating the host device 4, the host device 4 will send a BT connection request (S1) for a connection with the radiocommunication device 2 via the short-range radiocommunication network 10 in order to establish a BT-based connection with the radiocommunication device 2.

The host device 3 operates according to the lower five layers of the protocol stack 12 while the radiocommunication device 2 operates according to the lower five layers of the protocol stack 11a corresponding to the host device 3, thereby establishing a BT-based link (at step ST1). At this time, the radiocommunication CPU 69 of the radiocommunication device 2 recognizes the request for BT connection (S1) from the host device 3, reads out the personal information and network setting information and stores them once into the RAM 67, then controls the radiocommunication unit 61 and base-band controller 63, thereby establishing a link with the host device 3 via the short-range radiocommunication network 10.

When the BT-based link is established, the radiocommunication CPU 69 of the radiocommunication device 2 sends a BT connection completion message (S2) to the host device 3.

The host device 3 sends, to the radiocommunication device 2 via the short-range radiocommunication network 10, a request (S3) for connection to the Internet network 40. The radiocommunication CPU 69 of the radiocommunication device 2 reads the PPP of the protocol stack 11b from the ROM 68 and starts the PPP, on the basis of the Internet connection. request (S3) from the host device 3 (at step ST3).

Upon reception of the Internet connection request (S3) from the host device 3, the radiocommunication CPU 69 of the radiocommunication device 2 refers to the phone number of the Internet service provider 41, stored in the RAM 67, and provides the sending request and phone number to the mobile network 74. Supplied with the sending request and phone number fro the radiocommunication CPU 69 via the interface 64, the mobile network 74 sends a setup request (SET UP1) (S4) being a call setting message to the public communication network 30 via the mobile network 20.

Upon reception of the setup request (S4), the public communication network 30 sends a setup request (SET UP2) (S5) having the same content as that of the setup request (S4) to the Internet service provider 41.

Receiving the setup request (S5), the Internet service provider 41 responds to the setup request (S5) when it is not busy and can receive user data, to return a response message (CONNECT2) (S6) to the public communication network 30.

Upon reception of the response message (S6) from the Internet service provider 41, the public network 30 transfers a response message (CONNECT1) (S7) to the radiocommunication device 2 via the mobile network 20.

Upon reception of the response message (S7), the mobile network 74 of the radiocommunication device 2 recognized that the connection with the Internet service provider 41 is complete, and shifts to a link establishment phase (at step ST4).

Next, the radiocommunication CPU 69 starts an authentication according to the PPP (at step ST5), refers to the user ID and password stored as the personal information in the RAM 67, and sends and receives an authentication data (S8) for authentication with the Internet service provider 41. When the authentication with the Internet service provider 41 is established, the radiocommunication CPU 69 shifts to an authentication establishment phase (at step ST6).

Upon completion of the authentication, the radiocommunication CPU 69 controls the radiocommunication unit 61 and base-band controller 63 to send an Internet connection completion message (S9) to the host device 3.

Next, the radiocommunication CPU 69 begins to start the network layer protocol, reads a program indicating the operations under the TCP and IP in the protocol stack 11b from the ROM 68, and starts the program. The radiocommunication CPU 69 stores into the RAM 67 an IP address dynamically assigned by the operation under the PPP (at step ST7).

Next, the host device 3 sends a destination IP address of user data destination and user data (S10) to the radiocommunication device 2 via the short-range radiocommunication network 10. On the other hand, the radiocommunication CPU 69 stores a destination IP address and user data (S10) from the host device 3 once into the RAM 67, and executes the TCP/IP 9 (at step ST8). That is, the radiocommunication CPU 69 adds TCP header to the user data, takes its own IP address stored in the RAM 67 as a source IP address and adds IP header to the user data by the use of the source IP address and destination IP address, thereby encapsulating the user data by the TCP/IP. The radiocommunication device 2 sends the user data encapsulated by the TCP/IP (S11) to the WWW server 42 designated with the destination IP address via the Internet service provider 41.

When the TCP-IP-encapsulated user data (S11) is sent from the WWW server 42 to the mobile communication unit 74 of the radiocommunication device 2 via the Internet service provider 41, the radiocommunication CPU 69 will execute the TCP/IP (at step ST8) to separate the IP and TCP headers from the user data, thereby decapsulating the TCP/IP-encapsulated user data. The radiocommunication CPU 69 takes the IP address of the WWW server 42 as a source IP address and sends the source IP address and user data (S12) as data from the WWW server 42 to the host device 3.

With the above operations, the radiocommunication device 2 can encapsulate the user data (S10) from the host device 3 and sends it to the WWW server 42, and also decapsulate the user data (S11) sent from the WWW server 42 to the mobile communication unit 74 of the radiocommunication device 2 and send the decapsulated user data (S12) to the host device 3. The radiocommunication device 2 repeats these operations to make a connection between the host device 3 and Internet network 40.

In addition to the above, in the radiocommunication device 2, user data stored in the external memory module installed in the card slot 53 may be encapsulated for sending to the WWW server 42.

Since in the radiocommunication system 1 having the above radiocommunication device 2, there are used the protocol stack 11a for. making a connection to outside the short-range radiocommunication network 10 for data sending and reception and protocol stack 11b for sending and reception of radio data by the short-range radiocommunication network 10, the radiocommunication device 2 can be used as a gateway for connecting the host device 3 to the Internet network 40.

Also in the radiocommunication system 1 provided with the radiocommunication device 2, the host device 3 can easily be connected to the Internet network 40 by executing the network connection of TCP, IP and PPP by the use of the network setting information and personal information stored inside the radiocommunication device 2, not by the host device 3. That is, the host device 3 can be connected to the Internet network 40 without having to store any network setting information and personal information required for connection to the Internet network 40 and having to install therein any information setting function, and network connection protocols such as the TCP, IP and PP and mobile communication protocol.

In the radiocommunication system 1, a host device in which network setting information and personal information have been set by another user and a host device of other user, in which no network setting information and personal information have been set, can be connected to the Internet service provider 41 by the user of the network setting information and personal information stored in the radiocommunication device 2.

Further, in the radiocommunication system 1, the host device has only to incorporate a module which is only connected to the radiocommunication device 2 via the BT-based short-range radiocommunication network 10, which leads to a compact design, low power consumption and low costs of the host device 3.

The external memory module 90 installed in the card slot 53 of the above radiocommunication device 2 according to the present invention may be a one designed and manufactured based on the physical specifications and data communication specifications of any of various types of flash memory cards. That is, the external memory module may incorporate a Bluetooth-oriented chip or the like intended for the above operations and designed and manufactured based on the physical and data communication specifications of any of flash memory cards including a Compact Flash (36 mm in length, 42 mm in width and 3.3 mm in thickness) proposed by the SanDisk Corporation (USA), Smart Media (full name: Solid State Floppy Disc Card) (45 mm in length, 37 mm in width and 0.76 mm in thickness) proposed by Toshiba (Japan), Multimedia Card (32 mm in length, 24 mm in width and 1.4 mm in thickness) standardized by a company called "Multimediacard Association", and SD Memory Card (32 mm in length, 24 mm in width and 2.1 mm in thickness) developed by the Matsushita Electric Industrial Co., Ltd (Japan), SanDisk Corporation (USA) and Toshiba (Japan).

In the foregoing, the present invention has been described concerning an example in which a radio wave whose frequency is included in the 2.4 GHz band is sent and received inside the short-range radiocommunication network 10 for connection of the host device 3 and public communication network 30 to each other. However, it is of course that the present invention can be applied to connect the host device 3 and Internet network 40 to each other in a wireless LAN in which a radio wave whose frequency is included in a 5 GHz band, as proposed in the IEEE (Institute of Electrical and Electronics Engineers) 802.11a for example.

As having been described in the foregoing, in the communication apparatus according to the present invention, since a relation of connection with an external communication network via the radiocommunication network is set based on the communication setting information to provide such a control that data is transferred between the external communication network and host device, a relation of connection with the external communication network can be internally established independently of any communication setting of the host device to connect the host device to the external communication network such as the Internet network. Therefore, the communication apparatus according to the present invention permits to set a connection of each of a plurality of host devices and easily make a network setting for connection of the host device to the Internet network or the like, only by changing the internal setting.

In the communication method according to the present invention, communication setting information on an external communication network, internally stored, can be used to set a relation of connection between a communication apparatus and external communication network, the relation of connection between the communication apparatus and external communication network can be used to transfer data between the communication apparatus and external communication network, and data can be transferred between the communication apparatus and host device via a radiocommunication network o control data transfer between the host device and external communication network. So, a relation of connection to the external communication network can be established inside the communication apparatus irrespectively of any communication setting of the host device to connect the host device to the external communication network such as an Internet network or the like. Therefore, the communication method according to the present invention permits to set a connection of each of a plurality of host devices and easily make a network setting for connection of the host device to the Internet network or the like, only by changing the internal setting.

The invention claimed is:

1. A communication apparatus comprising:
   radiocommunication means for sending data to and for receiving data from a host device via a radiocommunication network;
   external communication means for connection to an external communication network outside the radiocommunication network to send data to and to receive data from the external communication network;
   storage means for storing a radiocommunication protocol for use in sending and receiving data within the radiocommunication network, an external communication protocol for use in sending and receiving data to and from the external communication network, and communication setting information on the external communication network and authentication information for authenticating a user;
   authenticating means for carrying out an authentication process based on the authentication information with a server connected to the external network; and
   communication controlling means for controlling the external communication means by a use of the communication setting information stored in the storage means to set a connection with the external communication network according to the external communication protocol while controlling the radiocommunication means to set a connection with the host device according to the radiocommunication protocol stored in the storage means to control the radiocommunication means and the external communication means to transfer data between the external communication network and the host device;
   wherein the radiocommunication network is a short-range Bluetooth network;
   wherein the host device uses the external communication means as a gateway such that the host device only uses the radiocommunication protocol and does not directly use the external communication protocol to connect to the external communication network.

2. The apparatus according to claim 1, wherein the storage means stores a mobile telephone communication protocol for use in connecting to a mobile network; and
   the communication controlling means uses the mobile telephone communication protocol stored in the storage means for use in connecting to the mobile network to set a connection between the mobile network and the host device via the radiocommunication network.

3. The apparatus according to claim 1, wherein the storage means stores personal information corresponding to a user of the host device; and
   the communication controlling means uses the communication setting information and the personal information stored in the storage means to transfer data between the host device and the external communication network.

4. The apparatus according to claim 1, wherein the storage means stores at least one of PPP (point to point protocol), IP (Internet protocol) and TCP (transport control protocol) as the external communication protocol; and
   the communication controlling means uses at least one of the protocols stored in the storage means to set a relation of connection between the external communication means and the external communication network to control data transfer between the host device and the external communication network.

5. A communication method for transferring data between a host device and a communication apparatus via a radiocommunication network while transferring data between an external communication network outside the radiocommunication network and the communication apparatus, the method comprising the steps of:
   setting a relation of connection between the communication apparatus and the host device according to a radiocommunication protocol held in the communication apparatus, while setting a relation of connection between the communication apparatus and the external communication network according to an external communication protocol by using communication setting information on the external communication network held in the communication apparatus;
   transmitting and receiving data between the external communication network and the host device by using the relation of connection between the communication apparatus and the host device and the relation of connection between the communication apparatus and external communication network; and
   carrying out an authentication process based on authentication information obtained from the communication apparatus with a server coupled to the external communication network;
   wherein the radiocommunication network is a short-range Bluetooth network;
   wherein the host device uses the communication apparatus as a gateway such that the host device only uses the radiocommunication protocol and does not directly use the external communication protocol to connect to the external communication network.

6. The method according to claim 5, wherein a mobile telephone communication protocol for use in connecting to a mobile network is held in the communication apparatus; and
   the mobile telephone communication protocol is used to set the relation of connection between the mobile network and host device via the radiocommunication network.

7. The method according to claim 5, further comprising the steps of:
   holding personal information corresponding to a user of the host device in the communication apparatus; and
   setting the relation of connection between the host device and the external communication network according to the external communication protocol by using the communication setting information and the personal information.

8. The method according to claim 5, further comprising the steps of:
   holding at least one of PPP (point to point protocol), IP (Internet protocol), and TCP (transport control protocol) in the communication apparatus as the external communication protocol; and setting a connection between the communication apparatus and the external communication network by using at least one of the protocols.

9. A communication apparatus operable for use with a host device and a server, said apparatus comprising:

radiocommunication means for sending data to and for receiving data from the host device via a short-range radiocommunication network;

external communication means for connection to an external communication network which is different from the radiocommunication network to send data to and to receive data from the external communication network;

storage means for storing a radiocommunication protocol for use in sending and receiving data within the radiocommunication network, an external communication protocol for use in sending and receiving data to and from the external communication network, and communication setting information for use in setting the connection to the external communication network;

communication controlling means for controlling the external communication means by use of the communication setting information stored in the storage means to set a connection with the external communication network according to the external communication protocol and for controlling the radiocommunication means to set a connection with the host device according to the radiocommunication protocol stored in the storage means so as to enable data to be transferred between the external communication network and the host device, in which the host device does not have the external communication protocol and the communication setting information stored therein;

wherein the short-range radiocommunication network is a Bluetooth network and the radiocommunication protocol does not include at least one of PPP (point to point protocol), IP (Internet protocol), and TCP (transport control protocol);

wherein the host device uses the communication apparatus as a gateway such that the host device only uses the radiocommunication protocol and does not directly use the external communication protocol to connect to the server.

* * * * *

UNITED STATES PATENT AND TRADEMARK OFFICE

CERTIFICATE OF CORRECTION

| | |
|---|---|
| PATENT NO. | : 7,289,479 B2 |
| APPLICATION NO. | : 09/980867 |
| DATED | : October 30, 2007 |
| INVENTOR(S) | : Kunio Fukuda |

It is certified that error appears in the above-identified patent and that said Letters Patent is hereby corrected as shown below:

Title Page;

On the face of the Patent (54) the title should read --COMMUNICATION

APPARATUS AND METHOD--;

Column 1, line 1 delete the word "DEVICE" and replace with --APPARATUS--;

Column 1, line 2 delete the word "COMMUNICATION";

Column 1, line 31, ")" should read --).--;

Column 2, line 58, "etc" should read --etc.--;

Column 4, line 12, "complicate" should read --complicated--;

Column 5, line 2, "that" should read --that of--;

Column 6, line 7, the word "th" should read --the--;

Column 6, line 36, insert commas --,-- after the number "10" and the word "example";

Column 7, line 67, insert commas --,-- after the word "therein" and "example";

Column 8, line 26, insert the word --to-- after the word "according";

Column 9, line 1, insert a comma --,-- after the word "display";

Column 9, line 2, insert a comma --,-- after the word "example";

Column 9, line 3, insert a comma --,-- after the words "displays" and "example";

Column 9, line 9, insert a comma --,-- after the words "is" and "example";

Column 9, line 16, insert a comma --,-- after the words "receives" and "example";

Column 9, line 24, insert a comma --,-- after the word "pins";

Column 9, line 25, insert a comma --,-- after the word "example";

Column 9, line 27, insert a comma --,-- after the words "access" and "example";

UNITED STATES PATENT AND TRADEMARK OFFICE
CERTIFICATE OF CORRECTION

PATENT NO. : 7,289,479 B2
APPLICATION NO. : 09/980867
DATED : October 30, 2007
INVENTOR(S) : Kunio Fukuda It is certified that error appears in the above-identified patent and that said Letters Patent is hereby corrected as shown below:

Column 9, line 37, insert a comma --,-- after the word "thickness";

Column 9, line 38, insert a comma --,-- after the word "example";

Column 9, line 53, "and" should read --an--;

Column 11, line 56, delete the comma "," after the word "controlled";

Column 12, line 9, insert a comma --,-- after the words "includes" and "example";

Column 12, line 37, delete the words "makes data transfer to and from";

Column 13, line 49, delete the comma "," after the number "1";

Column 14, line 19, delete the period "." after the word "connection";

Column 14, line 45, "recognized" should read --recognizes--;

Column 15, line 29, "sends" should read --send--;

Column 15, line 41, delete the comma "," after the number "2";

Column 15, line 42, delete the period "." after the word "for";

Column 15, line 63, insert a comma --,-- after the word "device";

Column 17, line 1, "network o" should read --network of--;

UNITED STATES PATENT AND TRADEMARK OFFICE
CERTIFICATE OF CORRECTION

PATENT NO.       : 7,289,479 B2
APPLICATION NO.  : 09/980867
DATED            : October 30, 2007
INVENTOR(S)      : Kunio Fukuda It is certified that error appears in the above-identified patent and that said Letters Patent is hereby corrected as shown below:

Column 18, line 31, insert the word --the-- before the word "external".

Signed and Sealed this

Fourteenth Day of October, 2008

JON W. DUDAS
*Director of the United States Patent and Trademark Office*